United States Patent
Yang

(10) Patent No.: US 11,709,776 B2
(45) Date of Patent: Jul. 25, 2023

(54) METHODS AND SYSTEMS FOR A STRIPE MODE CACHE POOL

(71) Applicant: Pensando Systems Inc., Milpitas, CA (US)

(72) Inventor: Changqi Yang, Dublin, CA (US)

(73) Assignee: Pensando Systems Inc., Milpitas, CA (US)

( * ) Notice: Subject to any disclaimer, the term of this patent is extended or adjusted under 35 U.S.C. 154(b) by 0 days.

(21) Appl. No.: 17/216,447

(22) Filed: Mar. 29, 2021

(65) Prior Publication Data
US 2022/0309002 A1 Sep. 29, 2022

(51) Int. Cl.
| | |
|---|---|
| *G06F 12/08* | (2016.01) |
| *G06F 12/02* | (2006.01) |
| *G06F 12/0864* | (2016.01) |
| *G06F 12/0811* | (2016.01) |
| *G06F 12/084* | (2016.01) |

(52) U.S. Cl.
CPC ...... *G06F 12/0864* (2013.01); *G06F 12/0238* (2013.01); *G06F 12/084* (2013.01); *G06F 12/0811* (2013.01); *G06F 2212/1021* (2013.01)

(58) Field of Classification Search
CPC ............. G06F 12/0864; G06F 12/0238; G06F 12/0811; G06F 12/084; G06F 2212/1021; G06F 12/0802; G06F 12/128; G06F 2212/6032; G06F 2212/6082
See application file for complete search history.

(56) References Cited

U.S. PATENT DOCUMENTS

| | | | |
|---|---|---|---|
| 7,127,560 B2 | 10/2006 | Cohen et al. | |
| 8,069,308 B2 | 11/2011 | Larson et al. | |
| 8,745,618 B2 | 6/2014 | Lin et al. | |
| 2006/0212654 A1 | 9/2006 | Balakrishnan | |
| 2009/0327611 A1* | 12/2009 | Fang | G06F 12/126 711/128 |
| 2011/0271055 A1* | 11/2011 | O'Connor | H03M 7/30 711/118 |
| 2012/0198174 A1* | 8/2012 | Nellans | G06F 3/0655 711/133 |

(Continued)

OTHER PUBLICATIONS

Wikipedia, "CPU cache", https://en.wikipedia.org/wiki/CPU_cache, retrieved from internet Feb. 16, 2021, 24 pgs.

(Continued)

*Primary Examiner* — Masud K Khan
(74) *Attorney, Agent, or Firm* — Loza & Loza LLP

(57) ABSTRACT

N-way associative cache pools can be implemented in an N-way associative cache. Different cache pools can be indicated by pool values. Different processes running on a computer can use different cache pools. An N-way associative cache circuit can be configured to have one or more stripe mode cache pools that are N-way associative. A cache control circuit can receive a physical address for a memory location and can interpret the physical address as fields including a tag field that contains a tag value and a set field that contains a set value. The physical address can also be used to determine a pool value that identifies one of the stripe mode cache pools. A set of N cache entries in the one of the stripe mode cache pools can be concurrently searched for the tag value. The set of N cache entries is determined using the set value.

20 Claims, 11 Drawing Sheets

(56) References Cited

U.S. PATENT DOCUMENTS

2018/0101483 A1* 4/2018 Catthoor ............. G06F 12/0897
2020/0341536 A1* 10/2020 Waugh .................. G06F 1/3275
2020/0409867 A1* 12/2020 Colglazier .......... G06F 12/0895

OTHER PUBLICATIONS

Shuler, Kurt, "The Role of Las-Level Cache Implementation for SoC Developers", https://www.allaboutcircuits.com/industry-articles/last-level-cache-implementation-for-soc-developers/, retrieved from internet Feb. 16, 2021, 6 pgs.

* cited by examiner

METHODS AND SYSTEMS FOR A STRIPE MODE CACHE POOL

TECHNICAL FIELD

The embodiments relate to caches, cache control circuits, dynamic random-access memory (DRAM) controllers, field programmable gate arrays (FPGAs), application specific integrated circuits (ASICs), last level caches, and more specifically to hardware implemented last level cache control circuits and last level caches.

BACKGROUND

Due to the large latency and the limited bandwidth of massive external memory devices such as double data rate (DDR) synchronous dynamic random-access memory (SDRAM) modules, system on chip (SOC) implementations often have last level cache (LLC) that can temporarily hold data that is read from, and may be stored to, the external memory. The SOC can have a hierarchical cache that includes a level 1 (L1) cache, a level 2 (L2) cache, a level 3 (L3) cache, and so forth. The L1 cache is the lowest level cache. The highest level cache is sometimes called the last level cache. The L1 cache is usually the smallest and fastest on-SOC cache while the LLC is usually the largest and slowest on-SOC cache. For example, the SOC can contain central processing unit (CPU) cores and special purpose cores. Each CPU core can have a L1 cache, all the CPU cores may share a L2 cache, and all the CPU cores and special purpose cores may share the LLC.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented in a method implemented by a cache control circuit. The method can include configuring an N-way associative cache circuit as a plurality of stripe mode cache pools that are N-way associative, receiving a physical address for a memory location, interpreting the physical address as a plurality of fields that include a tag field that contains a tag value and a set field that contains a set value, using the physical address to determine a pool value that identifies one of the stripe mode cache pools, and concurrently searching a set of N cache entries in the one of the stripe mode cache pools for the tag value, wherein the set of N cache entries is determined using the set value.

Another aspect of the subject matter described in this disclosure can be implemented by a system. The system can include an N-way associative cache circuit configured as a plurality of stripe mode cache pools that are N-way associative, and a cache control circuit. The cache control circuit can be configured to receive a physical address for a memory location, interpret the physical address as a plurality of fields that include a tag field that contains a tag value and a set field that contains a set value, use the physical address to determine a pool value that identifies one of the stripe mode cache pools, and concurrently search a set of N cache entries in the one of the stripe mode cache pools for the tag value, wherein the set value specifies the set of N cache entries.

Yet another aspect of the subject matter described in this disclosure can be implemented by a system. The system can include a last level caching means that is N-way associative and that caches DRAM memory contents, a means for configuring the last level caching means as a plurality of stripe mode cache pools that are N-way associative, and an identification means that includes an addressing means and that identifies a DRAM memory location, a pool selection means for selecting one of the stripe mode cache pools based on the identification means, and a means for specifying a set of N cache entries based on the addressing means and the pool selection means.

In some implementations of the methods and devices, a lookup table uses P consecutive bits of the physical address to determine the pool value. In some implementations of the methods and devices, nonconsecutive bits of the physical address determine the pool value. In some implementations of the methods and devices, a P1-bit pool value specifies a first one of the stripe mode cache pools, a P2-bit pool value specifies a second one of the stripe mode cache pools, and P1 does not equal P2. In some implementations of the methods and devices, the method further includes reconfiguring the N-way associative cache circuit as a single stripe mode cache pool. In some implementations of the methods and devices, the method further includes adding an additional stripe mode cache pool to the stripe mode cache pools. In some implementations of the methods and devices, the method further includes indicating a cache miss after concurrently searching the set of N cache entries for the tag value. In some implementations of the methods and devices, the method further includes indicating a cache hit after concurrently searching the set of N cache entries for the tag value. In some implementations of the methods and devices, the method further includes returning a cached data block after concurrently searching the set of N cache entries for the tag value. In some implementations of the methods and devices, a dynamic random-access memory (DRAM) controller is configured to cache data in the N-way associative cache circuit.

In some implementations of the methods and devices, the cache control circuit is configured to add an additional stripe mode cache pool to the stripe mode cache pools, and remove the additional stripe mode cache pool from the stripe mode cache pools. In some implementations of the methods and devices, the cache control circuit is configured to indicate a cache miss after concurrently searching the set of N cache entries for the tag value. In some implementations of the methods and devices, the cache control circuit is configured to indicate a cache hit after concurrently searching the set of N cache entries for the tag value. In some implementations of the methods and devices, the cache control circuit is configured to return a cached data block after concurrently searching the set of N cache entries for the tag value. Some implementations of the methods and devices include a dynamic random-access memory (DRAM) controller wherein the DRAM controller is configured to cache data in the N-way associative cache circuit.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

Throughout the description, similar reference numbers may be used to identify similar elements.

DETAILED DESCRIPTION

Figure 1:
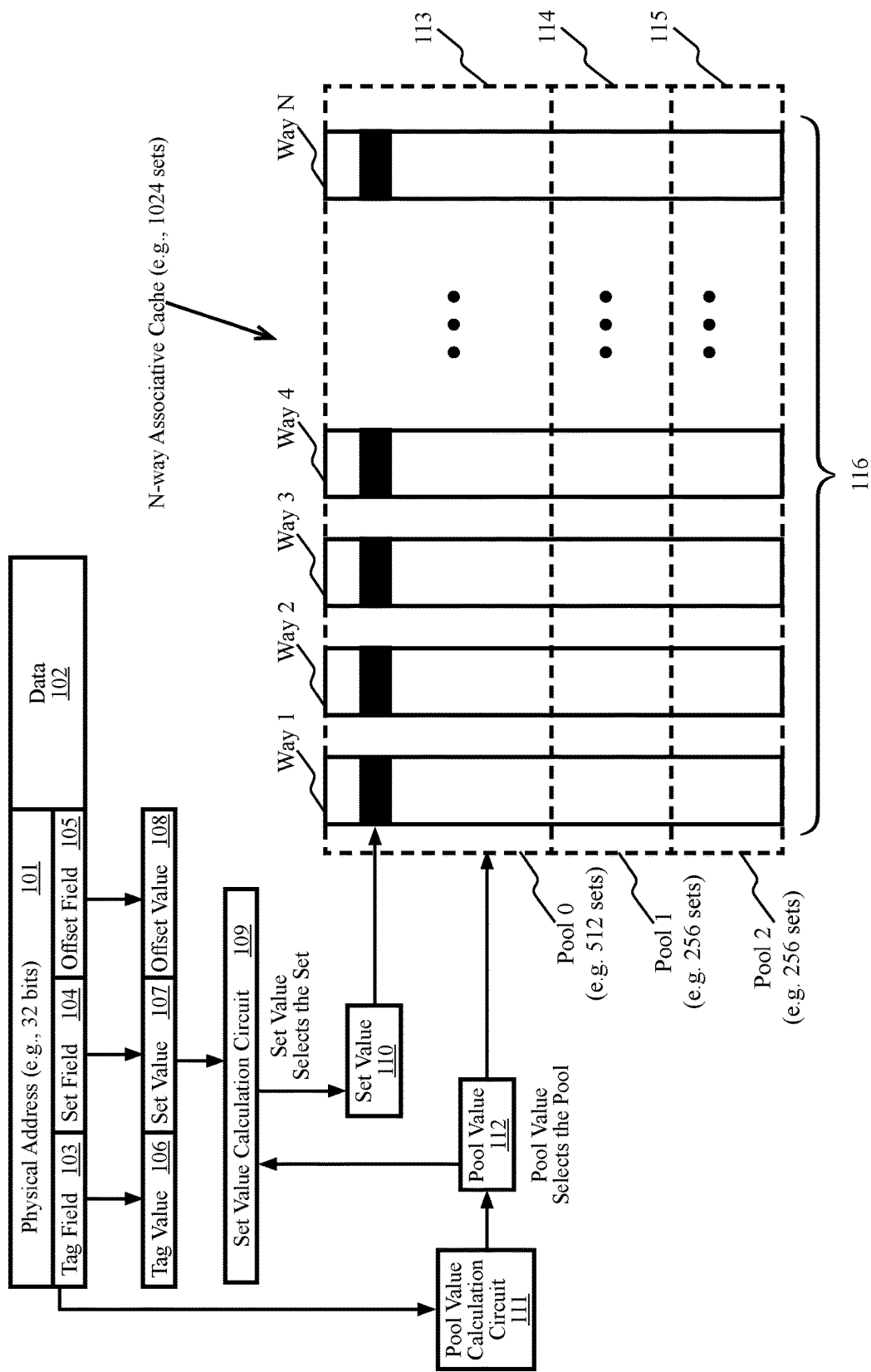
FIG. 1 is a high-level diagram illustrating an N-way associative cache that has three stripe mode cache pools according to some aspects.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Cache circuits can temporarily hold data that is fetched from or is to be stored to physical memory. For example, a system on a chip (SOC) can incorporate a last level cache (LLC) and an LLC controller. Data processing cores in the SOC can read or write data to an off-chip memory such as a DDR SDRAM module via memory I/O operations and the LLC can cache that data. A read operation for data at a physical address can be handled by the LLC if the LLC is caching that physical address. A write operation may be handled by the LLC if an appropriate cache entry is available such that the data can be written into the cache entry and then later written to the off-chip memory. In either case, the processing core is not delayed while waiting for an off-chip memory I/O operation to complete.

Cache control circuits often use the physical address to determine a cache row, also called a set. An N-way associative cache has N cache entries in each set. For example, the least significant ten bits of a physical address can indicate one of 1024 sets. (This example supposes each cache entry holds a single data word). Thousands or millions of physical memory addresses may therefore map to each one of the 1024 sets. A 2-way associative cache has two cache entries in each set. As such, each set in the 2-way associative cache can hold data for two physical memory locations. If both cache entries of a set are in use, then that particular set cannot be used to hold data for additional memory locations. An N-way associative cache has N cache entries in each set. If all N of the cache entries in a set are in use, then the cache circuit cannot cache additional data for memory locations that map to that particular set. An attempt to access one of those additional physical memory locations results in a cache miss. Cache misses cause processes to wait while the off-chip memory is accessed. In general, increasing the associativity of a cache (increasing N) results in fewer cache misses.

The SOC can concurrently run a number of different processes and processing threads and all those processes and threads may be attempting to read and write to the off-chip memory. A memory intensive process can fill the cache, thereby preventing the other processes from benefiting from the cache. In the past, this issue has been addressed by partitioning the N-way associative cache into, for example, an I-way associative cache and a J-way associative cache where I+J=N. If the cache hungry process uses one of the partitions, then it doesn't fill the other partition. Processes using the other partition can benefit by using the cache. The problem is that none of the processes has access to an N-way associative cache.

N-way associativity can be preserved by configuring the cache into stripe mode cache pools. For example, a 1024 set N-way associative cache can be configured as two 512 set N-way associative cache pools. One advantage is that the processes have access to an N-way associative cache pool, may thereby encounter fewer cache misses, and may run faster. Another advantage is that an N-way associative cache and cache controller circuits can include N cache search circuit instances that concurrently search N cache entries for a cache hit. An I-way cache partition formed from an N-way cache uses only I of the N cache search circuit instances with the remainder being rendered superfluous. Stripe mode pools use all N cache search circuit instances and thereby take greater advantage of the on-SOC circuitry.

FIG. 1 is a high-level diagram illustrating an N-way associative cache 116 that has three stripe mode cache pools according to some aspects. A memory I/O operation includes a physical address 101 and can include data 102. The physical address 101 can be interpreted as having a tag field 103, a set field 104, and an offset field 105. The tag field 103 can contain a tag value 106. The set field 104 can contain a set value 107, and the offset field 105 can contain an offset value 108. The N-way associative cache has M sets (also called cache rows) and has N ways. The N-way associative cache therefore has M*N cache entries with N cache entries in each set.

The N-way associative cache can be configured as an M-set, N-way associative cache. In such a configuration, the set value 107 can indicate the set to use for caching the physical address 101. For example, if M=1024, the set field can be 10 bits, and the set value 107 is a 10-bit value indicating one of the 1024 sets.

Memory I/O operations are often specified to write one or more words of data. The data stored in a cache entry can contain a data block that contains many words of data. For example, the memory I/O operation can be for writing a four-byte word whereas the cache entry data block can be 256 bytes that are read from and written to the external memory as a consecutive data block. The offset value 108 can indicate which of the four bytes in the cache entry data block correspond to the four-byte word of memory I/O operation.

The N-way associative cache can be configured with cache pools such as pool 0 113, pool 1 114, and pool 3 115. A pool value calculation circuit 111 can use the physical address 101 to determine a pool value 112. A set value calculation circuit 109 can use the physical address 101 and the pool value 112 to determine a set value 110. The example of FIG. 1 shows pool 0 having 512 sets, pool 1 having 256 sets, and pool 3 having 256 sets. All 1024 sets of the N-way associative cache have been assigned to one of the three pools. When the pool value indicates pool 0, the set value 110 can be a 9-bit number that indicates one of the 512 sets in pool 0. When the pool value indicates pool 1, the set value 110 can be an 8-bit number that indicates one of the 256 sets in pool 1. When the pool value indicates pool 2, the set value 110 can be an 8-bit number that indicates one of the 256 sets in pool 2.

Figure 2:
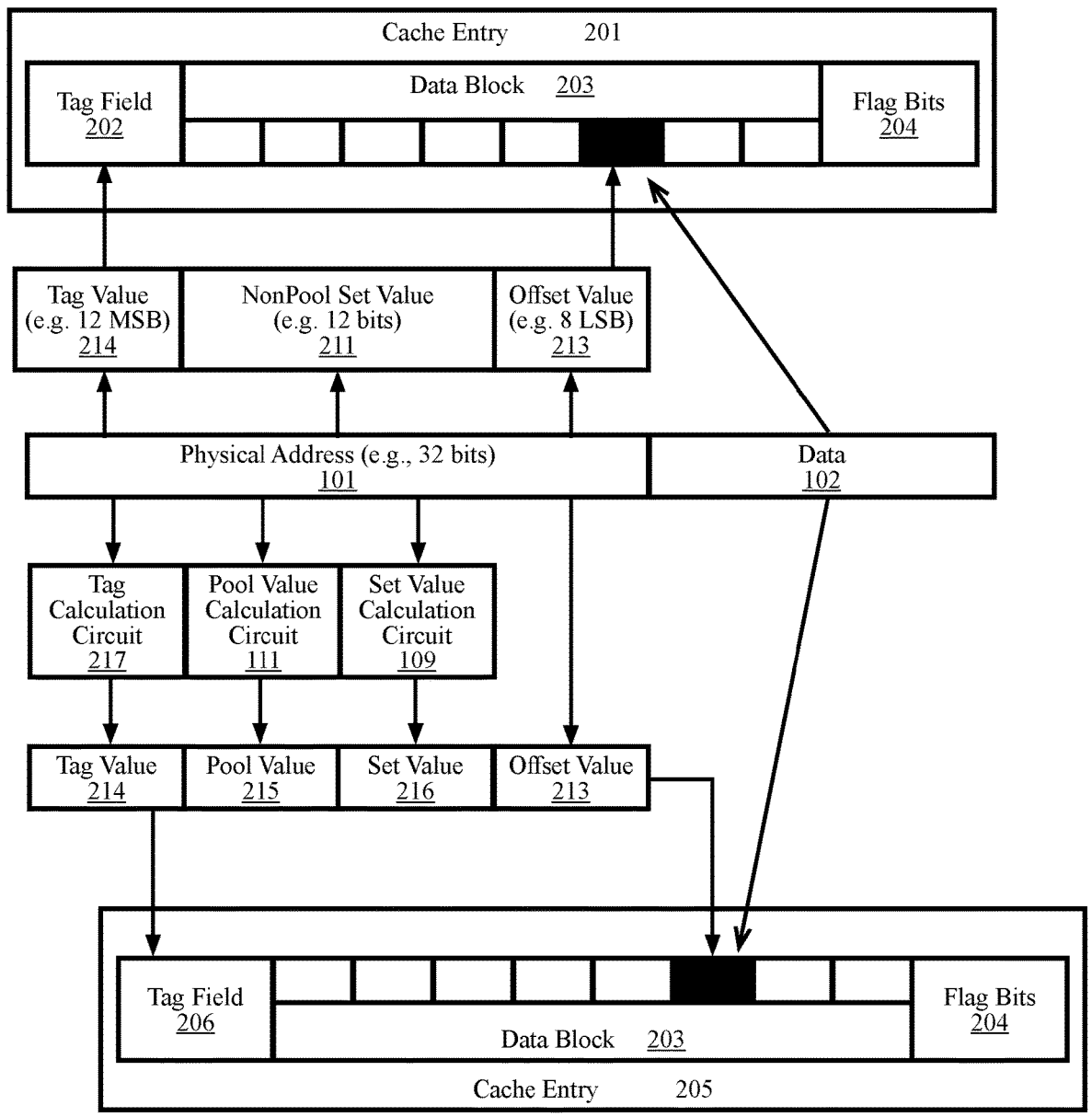
FIG. 2 is a diagram illustrating accessing cache entries according to some aspects.

FIG. 2 is a diagram illustrating accessing cache entries 201, 205 according to some aspects. The physical address 101 can be a 32-bit address. The example of FIG. 2 considers a 4096 set N-way associative cache. When the cache circuit is accessed as a 4096 set N-way associative cache, the physical address 101 can be interpreted as having a 12-bit tag value 214 as the most significant 12 bits, a 12-bit non-pool set value that indicates one of the 4096 sets, and an 8-bit offset value 213 that is the least significant 8 bits of the physical address. The cache entry 201 can include a tag field 202, a data block 203, and flag bits 204. If the tag field 202 in the cache entry contains a value that is the same as the tag value 214, then the cache entry 201 is caching the physical address 101. As such, comparing the tag value 214 to the value in the tag field 202 results in a cache hit. The offset value 213 is seen to indicate one of the words in the data block 203. The flag bits 204 can indicate if the cache entry is current free, is currently caching valid data, etc.

When the N-way associative cache is configured as pools, the physical address 101 can be input into a tag calculation circuit 217, a pool value calculation circuit 111, and a set value calculation circuit 109. The tag calculation circuit 217 uses the physical address to produce a tag value 214. The pool value calculation circuit 111 uses the physical address to produce a pool value 215. The set value calculation circuit 109 uses the physical address to produce a set value 216. The pool value 215 and the set value 216 can be used to select a pool and a set within the pool. A cache hit occurs when the tag value 214 is the same as the value in the tag field 206.

For some implementations, the set value 216 and be appended to the pool value 215 and used as a non-pool set value 211. Returning to the example of FIG. 1, a pool value "0" can indicate pool 0, a pool value "10" can indicate pool 1, and a pool value "11" can indicate pool 2. Prepending "0" to the 9-bit set value for pool 0 can yield a 10-bit non-pool set value. Using the 10-bit non-pool set value to index in the 1096-set, N-way associative cache yields the same result as using the 9-bit set value to index into the 512-set pool 0. Prepending "10" to the 8-bit set value for pool 1 can yield a 10-bit non-pool set value. Using the 10-bit non-pool set value to index in the 1096-set, N-way associative cache yields the same result as using the 8-bit set value to index into the 512-set pool 1. Prepending "11" to the 8-bit set value for pool 2 can yield a 10-bit non-pool set value. Using the 10-bit non-pool set value to index in the 1096-set, N-way associative cache yields the same result as using the 8-bit set value to index into the 512-set pool 2.

Figure 3:
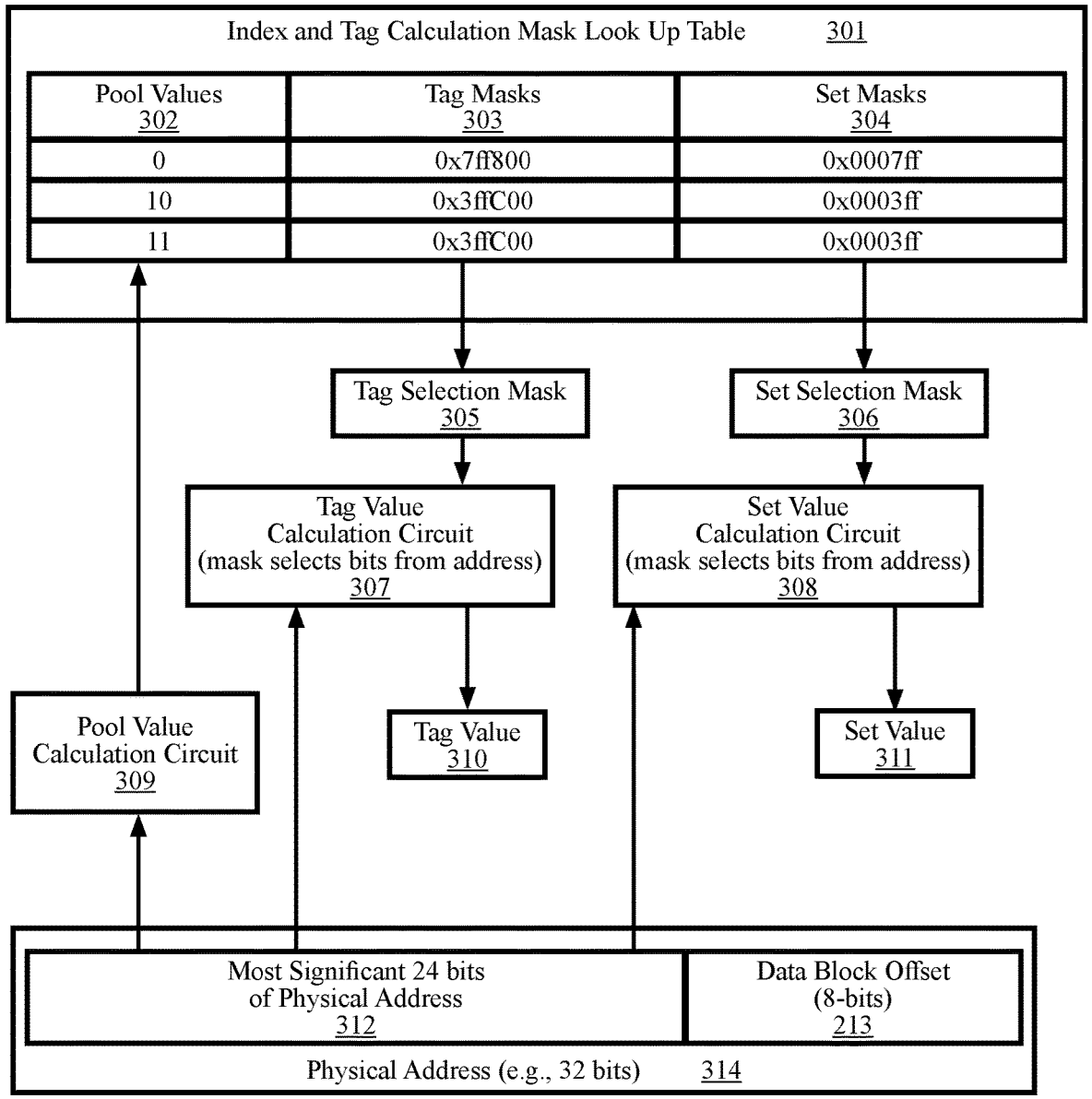
FIG. 3 is a diagram illustrating determining a pool value, a tag value, and a set value from a physical address according to some aspects.

FIG. 3 is a diagram illustrating determining a pool value, a tag value, and a set value from a physical address according to some aspects. The most significant 24 bits 312 of the 32-bit physical address 314 can be used to determine a pool value, a tag value 310, and a set value 311. The pool value calculation circuit determines the pool value which indicates which cache pool to use. The index and tag calculation mask lookup table 301 uses the pool values 302 as indexes to determine tag masks 303 and index masks 304. For example, a pool value of "0" determines a tag selection mask 305 of 0x7ff800 and a set selection mask 306 of 0x0007ff. The selection masks indicate which bits of the most significant 24 bits 312 to use as a tag value 310 or set value 311. A tag value selection circuit 307 can use the tag selection mask 305 and the most significant 24 bits 312 to determine the tag value 310. A set value selection circuit 308 can use the set selection mask 306 and the most significant 24 bits 312 to determine the set value 311.

Figure 4:
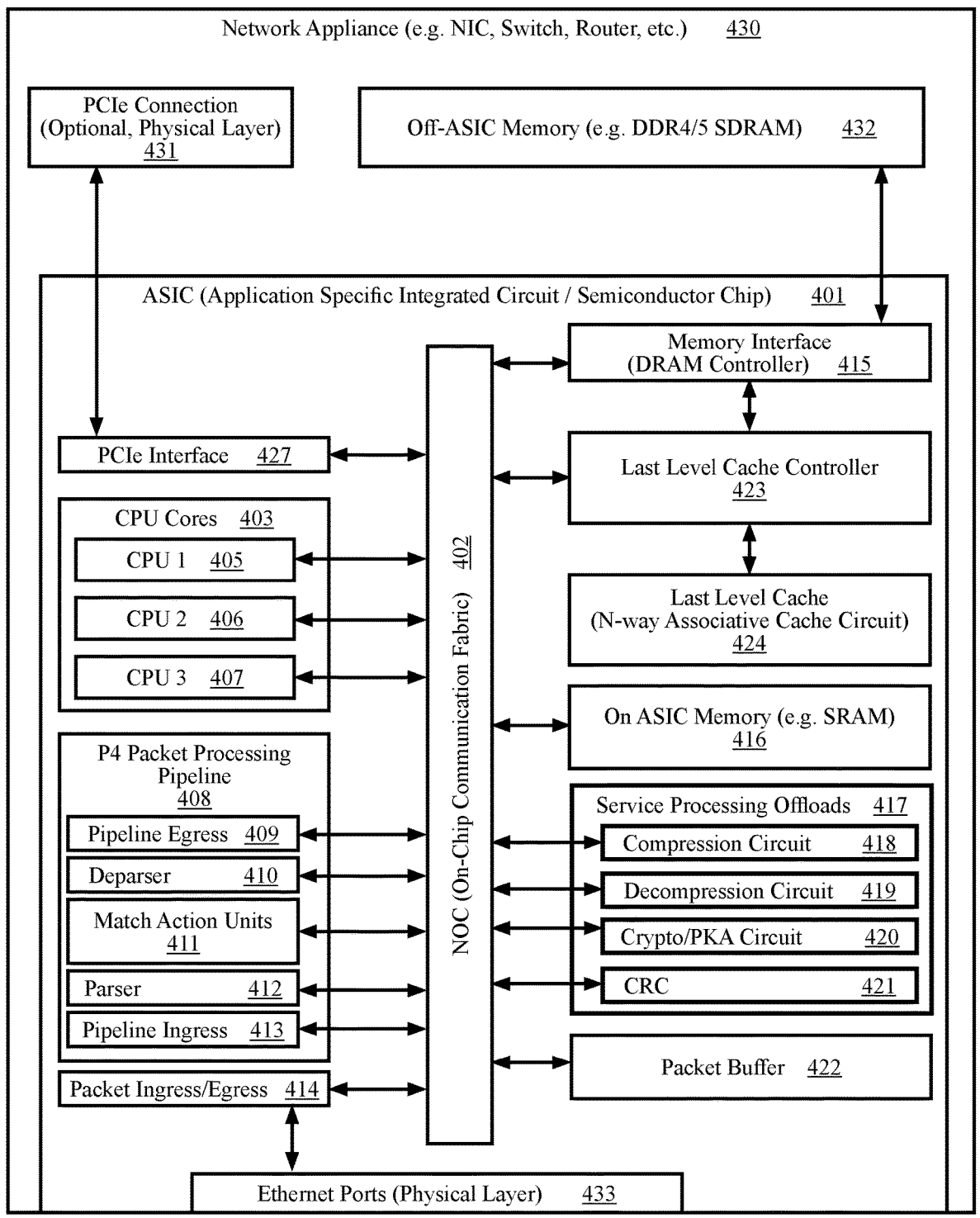
FIG. 4 is a functional block diagram of a network appliance such as a network interface card (NIC) or a network switch having an application specific integrated circuit (ASIC), according to some aspects.

FIG. 4 is a functional block diagram of a network appliance 430 such as a network interface card (NIC) or a network switch having an application specific integrated circuit (ASIC) 401, according to some aspects. A network appliance that is a NIC includes a peripheral component interconnect express (PCIe) connection 431 and can be installed in a host computer. A NIC can provide network services to the host computer and to virtual machines (VMs) running on the host computer. The network appliance 430 includes an off-ASIC memory 432, and ethernet ports 433. The off-ASIC memory 432 can be one of the widely available memory modules or chips such as DDR4 SDRAM modules or DDR5 SDRAM modules such that the ASIC has access to many gigabytes of memory. The ethernet ports 433 provide physical connectivity to a computer network such as the internet.

The ASIC 401 is a semiconductor chip having many core circuits interconnected by an on-chip communications fabric, sometimes called a network on a chip (NOC) 402. NOCs are often implementations of standardized communications fabrics such as the widely used advanced extensible interface (AXI) bus. The ASIC's core circuits can include a PCIe interface 427, central processing unit (CPU) cores 403, P4 packet processing pipeline 408 elements, memory interface 415, on ASIC memory (e.g., SRAM) 416, service processing offloads 417, a packet buffer 422, and packet ingress/egress circuits 414. A PCIe interface 427 can be used to communicate with a host computer via the PCIe connection 431. The CPU cores 403 can include numerous CPU cores such as CPU 1 405, CPU 2 406, and CPU 3 407. The P4 packet processing pipeline 408 can include a pipeline ingress circuit 413, a parser circuit 412, match-action units 411, a deparser circuit 410, and a pipeline egress circuit 409. The service processing offloads 417 are circuits implementing functions that the ASIC uses so often that the designer has chosen to provide hardware for offloading those functions from the CPUs. The service processing offloads can include a compression circuit 418, decompression circuit 419, a crypto/PKA circuit 420, and a CRC calculation circuit 421. The specific core circuits implemented within the non-limiting example of ASIC 401 have been selected such that the ASIC implements many, perhaps all, of the functionality of an InfiniBand channel adapter, of a non-volatile memory express (NVMe) card, and of a network appliance that processes network traffic flows carried by IP (internet protocol) packets.

The P4 packet processing pipeline 408 is a specialized set of elements for processing network packets such as IP packets, NVMe protocol data units (PDUs), and InfiniBand PDUs. The P4 pipeline can be configured using a domain-specific language. The concept of a domain-specific language for programming protocol-independent packet processors, known simply as "P4," has developed as a way to provide some flexibility at the data plane of a network appliance. The P4 domain-specific language for programming the data plane of network appliances is defined in the "P416 Language Specification," version 1.2.0, as published by the P4 Language Consortium on Oct. 23, 2019. P4 (also referred to herein as the "P4 specification," the "P4 language," and the "P4 program") is designed to be implementable on a large variety of targets including network switches, network routers, programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The memory interface 415 coordinates memory I/O operations to and from the off-ASIC memory 432. When the off-ASIC memory is DRAM, the memory controller may be called a DRAM controller. The ASIC can include a last level cache 424 and a last level cache controller 423. The last level cache 424 can include an N-way associative cache circuit.

The last level cache controller 423 can include circuits for determining pool values, set values, tag values, cache hits, cache misses, etc. The last level cache 424 can be an N-way associative cache circuit that is used by DRAM controller 415 for caching DRAM input/output operations (a.k.a. memory I/O operations).

The CPU cores 403 can be general purpose processor cores, such as reduced instruction set computing (RISC) processor cores, advanced RISC machine (ARM) processor cores, microprocessor without interlocked pipeline stages (MIPS) processor cores, and/or x86 processor cores, as is known in the field. Each CPU core can include a memory interface, an ALU, a register bank, an instruction fetch unit, and an instruction decoder, which are configured to execute instructions independently of the other CPU cores. The CPU cores may be programmable using a general-purpose programming language such as C.

The CPU cores 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 403 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the network interfaces 433 to packet processing elements of the data plane and vice-versa. The packet processing elements can include a slow data path implemented in software and a fast data path implemented by packet processing circuitry 408.

The packet processing circuitry 408 can be a specialized circuit or part of a specialized circuit implementing programmable packet processing pipelines. Some embodiments include a P4 pipeline as a fast data path within the network appliance. The fast data path is called the fast data path because it processes packets faster than a slow data path that can also be implemented within the network appliance. An example of a slow data path is a software implemented data path wherein the CPU cores 403 and memory 432 are configured via software to implement a slow data path.

All memory transactions in the NIC 430, including host memory transactions, on board memory transactions, and registers reads/writes may be performed via a coherent interconnect 402. In one non-limiting example, the coherent interconnect can be provided by a network on a chip (NOC) "IP core" (in this one context, "IP" is an acronym for intellectual property). Semiconductor chip designers may license and use prequalified IP cores within their designs.

Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuits 408, CPU cores 403, memory interface 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
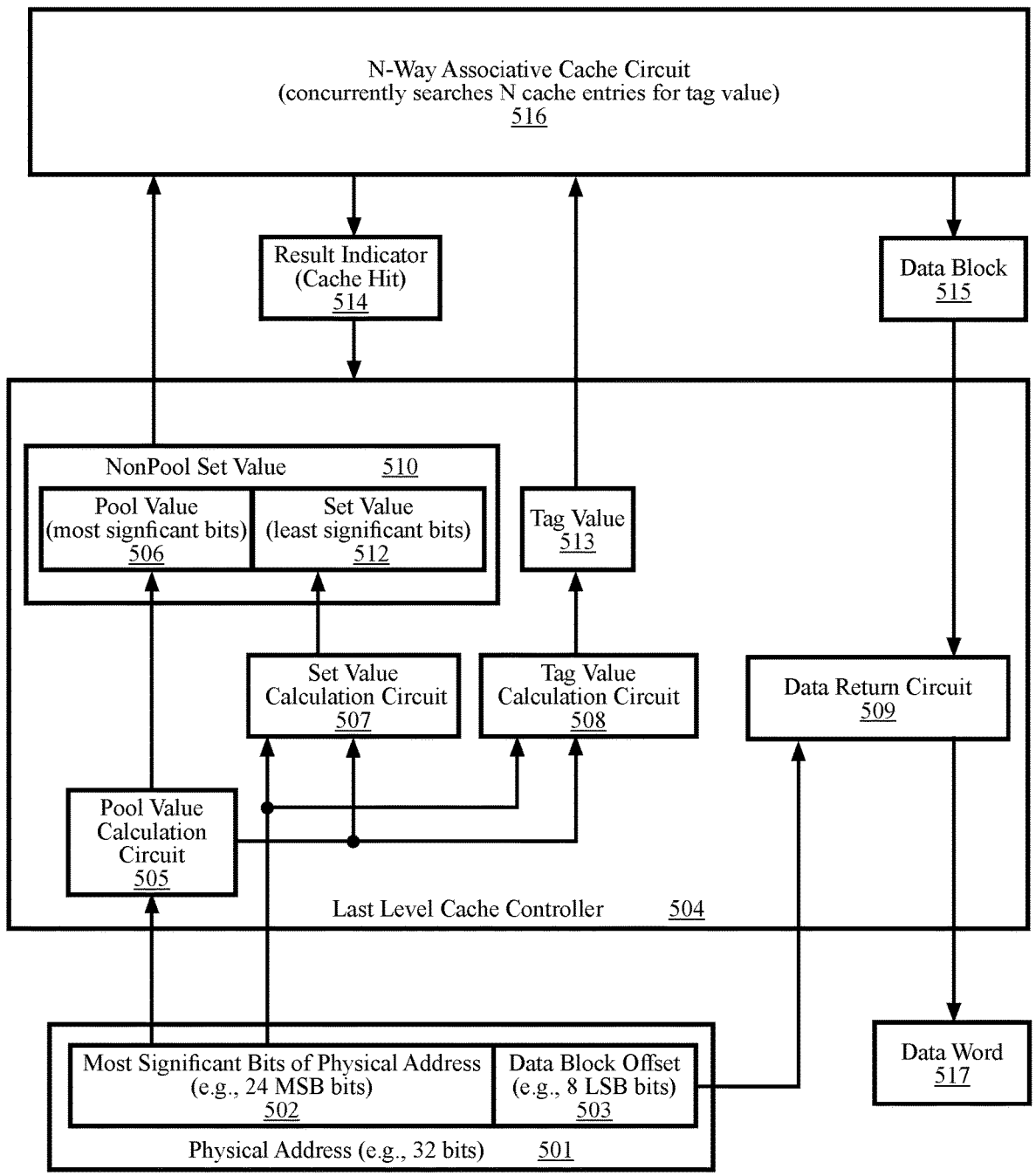
FIG. 5 is a high-level functional diagram of a last level cache controller according to some aspects.

FIG. 5 is a high-level functional diagram of a last level cache controller 504 according to some aspects. For a memory read operation, the LLC controller 504 receives the physical address 501 of a data word to be read. The location of the data word in a data block can be indicated by the data block offset 503 which can be the least significant bits (LSBs) of the physical address 501. The most significant bits (MSBs) 502 of the physical address 501 can be used to determine the pool value 506, the set value 512, and the tag value 513. The pool value calculation circuit 505 determines the pool value 506. The set value calculation circuit 507 determines the set value 512. The tag value calculation circuit 508 determines the tag value 513. The example of FIG. 5 appends the set value 512 to the pool value 506 to produce a non-pool set value 510. As such, the N-way associative cache circuit 516 can be configured to implement stripe mode cache pools entirely by the cache control circuit that produces the non-pool set values and tag values supplied by the cache controller 504. The LLC controller 504 provides the non-pool set value 510 and the tag value 513 to the LLC 516. If the physical address 501 is cached in the LLC 516, then the LLC 516 indicates a cache hit in the result indicator 514 and returns a data block 515. A data return circuit 509 uses the data block offset 503 to obtain the data word 517 from the data block 515. Here, the LLC concurrently searched N cache entries for the tag value and the LLC controller obtained the data word 517 from the data block 515. In other implementations, the LLC controller may concurrently search the N cache entries. In yet other implementations, the LLC may receive the data block offset and return the data word 517.

Figure 6:
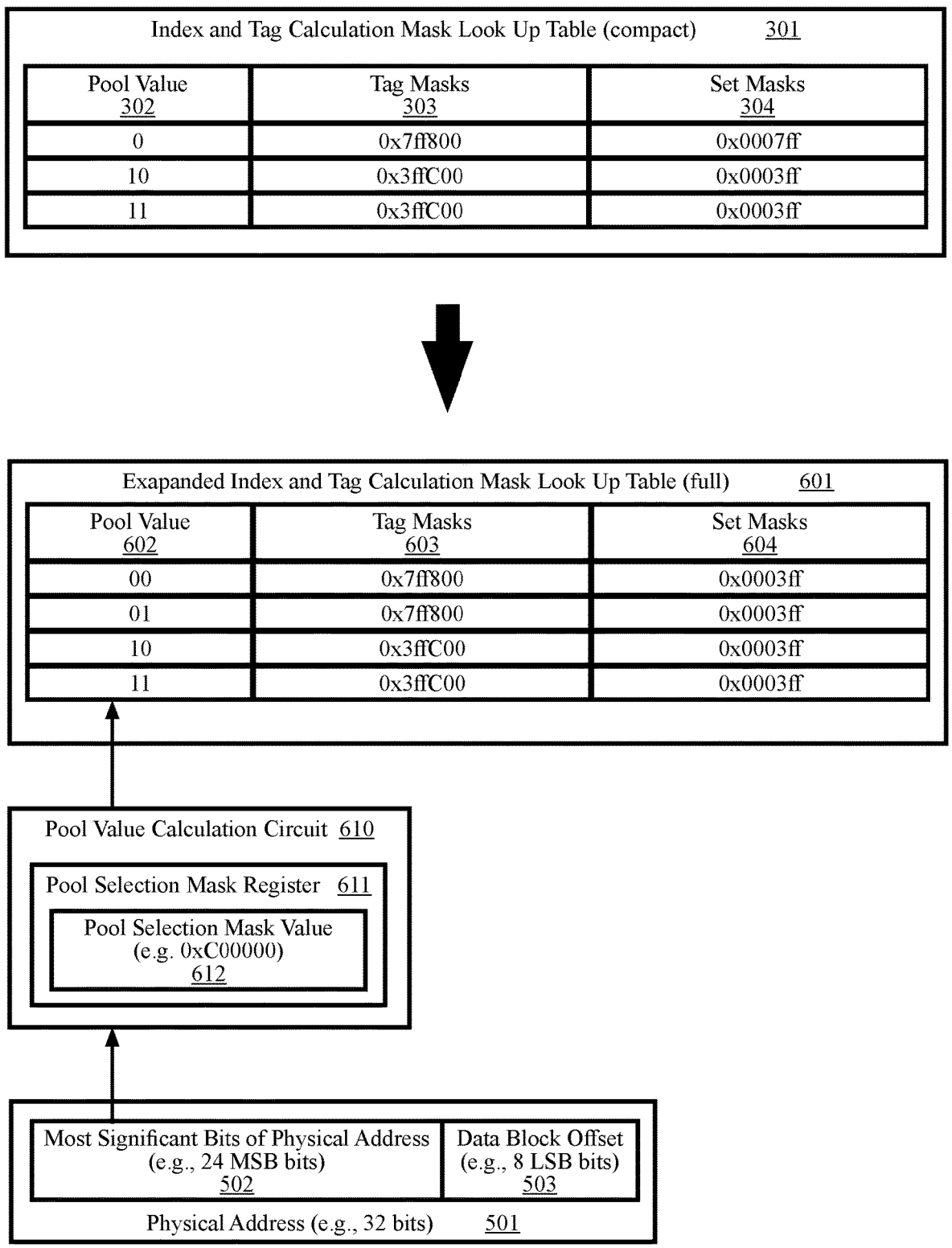
FIG. 6 illustrates using a lookup table to determine tag masks and index masks according to some aspects.

FIG. 6 illustrates using a lookup table to determine tag masks and index masks according to some aspects. A full lookup table 601 can provide the same functionality as the compact lookup table 301 illustrated in FIG. 3. In the compact table 301, pool 0 is represented by "0" and has 11-bit set values (the pool 0 set mask has 11 bits set to 1). In the non-limiting example of FIG. 5, the non-pool set value 510 is produced by appending the set value 512 to the pool value 506. Applying this operation to the pool 0 pool value and set values of FIG. 3 results in 12-bit non-pool set values. Observing that the MSB of the set value is a "0" or a "1", the expanded index and tag calculation mask lookup table 601 (the full table) has two entries for pool 0: "00" and "01". The set masks 604 have been altered to remove the MSB from the pool 0 set masks because that MSB is now part of the pool value. The tag masks 603 for the pool 0 entries are unchanged. For implementations that can use the full table, the full table may be easier to implement because the pool values are the same length and the set masks are the same.

FIG. 6 also provides an example of a pool value calculation circuit 610. The pool value calculation circuit 610 stores a pool selection mask value 612 in a pool selection mask register 611. A pool selection mask value 612 of 0xC00000 can select the two MSB of a 24-bit input as a pool value. The pool selection mask value 612, the values stored in the compact table 301, and the values stored in the full table 601 can be set programmatically by, for example, an ASIC CPU core. Using the most significant bits is one of the techniques that can be used for selecting the pool based on the region of memory being accessed.

Figure 7:
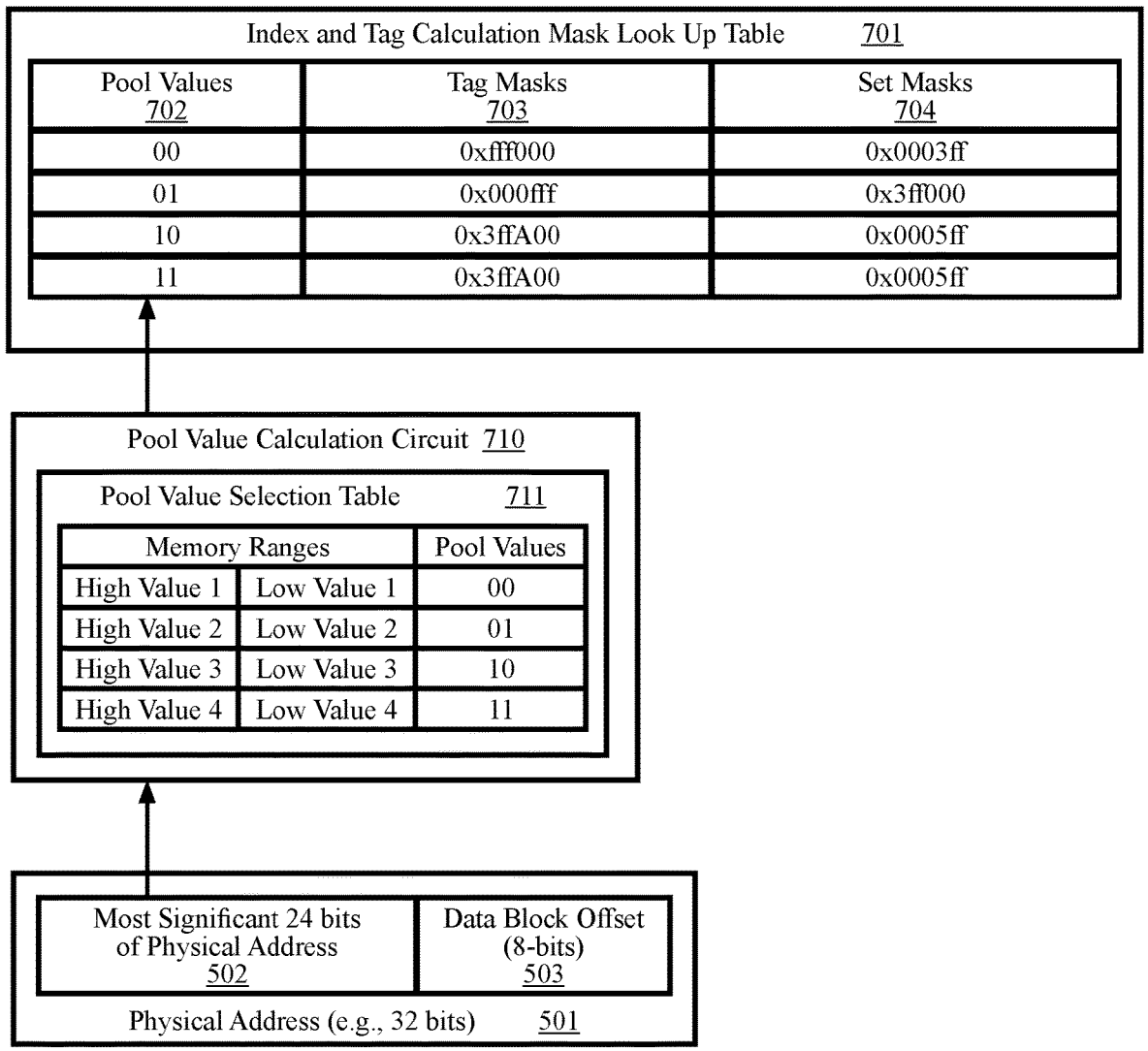
FIG. 7 illustrates using memory ranges to select pool values according to some aspects.

FIG. 7 illustrates using memory ranges to select pool values according to some aspects. The pool value calculation circuit 710 sets the pool values based on the memory range that includes the physical address 501. The pool value selection table 711 stores high values and low values for a set of memory ranges. A pool value is associated with each of the memory ranges. The pool value calculation circuit outputs the pool value "00" if the physical address 501 is between high value 1 and low value 1. The pool value calculation circuit outputs the pool value "01" if the physical address 501 is between high value 2 and low value 2. The pool value calculation circuit outputs the pool value "10" if the physical address 501 is between high value 3 and low value 3. The pool value calculation circuit outputs the pool value "11" if the physical address 501 is between high value 4 and low value 4.

The index and tag calculation mask lookup table 701 has tag masks 703 and set masks 704 that are indexed by the pool values 702. As can be seen the different pools use tag values and set masks produced from distinctly different areas of the physical address. Furthermore, pool values "10" and "11" appear to be implementing a single pool.

For brevity, the examples have illustrated 2-bit pool values. 2-bit pool values can define at most four pools. Pool values having more than two bits can define more than four pools. For example, 5-bit pool values can define up to 32 pools. In addition, the N-way associative cache can be configured to implement a single stripe mode cache pool. For example, the N-way associative cache may be implementing two N-way associative cache pools. Reconfiguring the N-way associative cache by deleting one of the two N-way associative cache pools results in an N-way associative cache that is implementing a single N-way associative cache pool. As such, the entire N-way associative cache may be treated as a single N-way associative cache pool.

Figure 8:
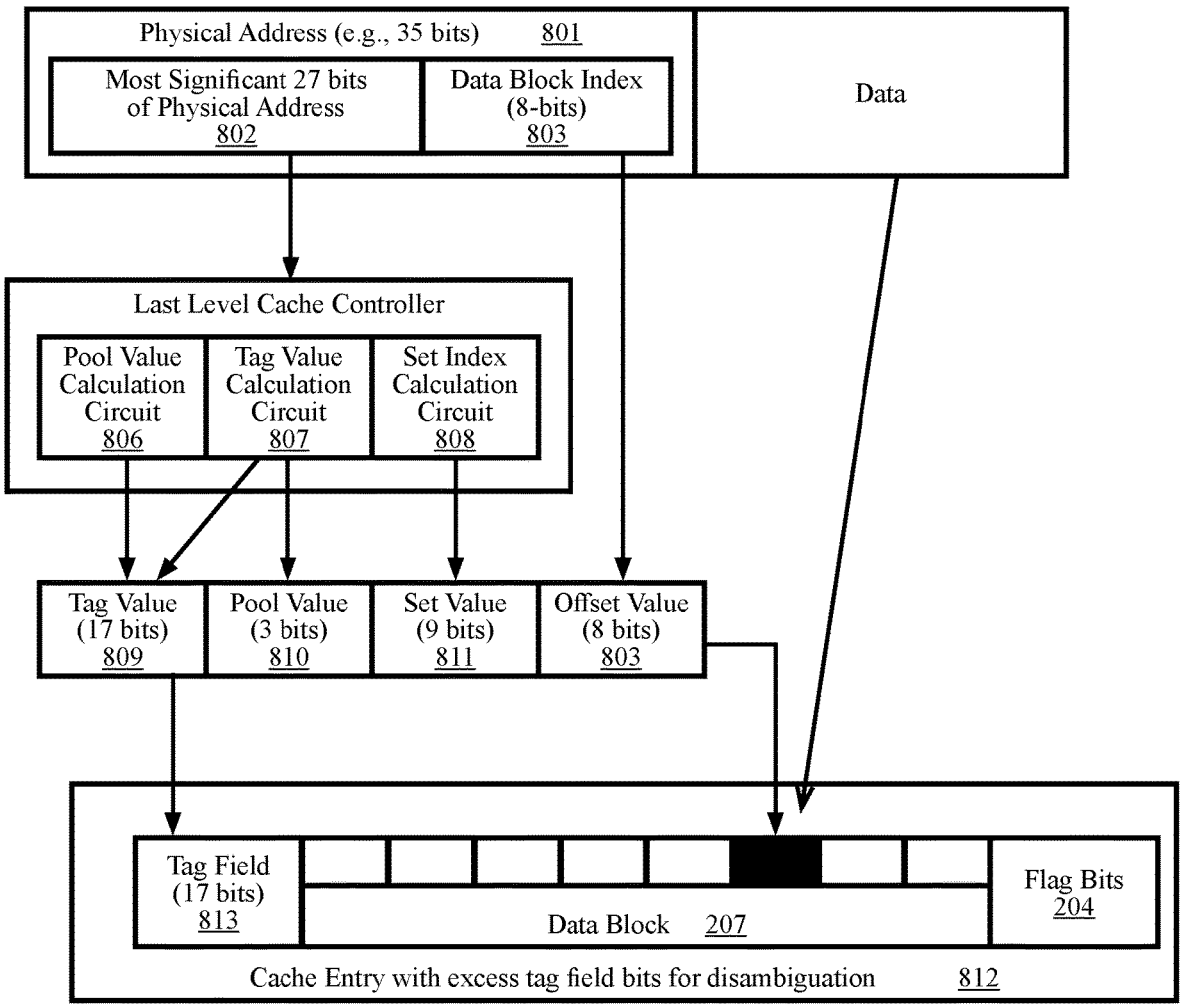
FIG. 8 is a high-level flow diagram illustrating using extra bits to disambiguate a tag field according to some aspects.

FIG. 8 is a high-level flow diagram illustrating using extra bits to disambiguate a tag field according to some aspects. The combination of tag value, set value, pool value, and offset value should always uniquely map to a physical memory address. For this reason, many implementations map the K most significant bits of the physical address into tag value, set value, and pool value with each of the K most significant bits mapped into a position in one of the values. The combined length of the tag value, set value, and pool value is therefore K-bits and no addressing information is lost because each of the K-bits is represented in one of the values. It may be desirable to implement stripe mode cache pools in such a manner that the set value and the pool value use the same bit from the physical address, thereby risking loss of addressing information. Another risk of address information loss can occur when using memory ranges (as shown in FIG. 7) instead of bit masks. In such cases, the addressing information can be preserved by using additional bits. In some implementations, the cache circuit may be adapted to have additional bits in the tag value of the cache entries. For example, given 27 MSBs 802 of a physical address 801, if the 3-bit pool value 810 and the 9-bit set value 811 both include the same two of the 24 MSBs, then the tag value length 809 can be 17-bits. The total length of the pool value, set value, and tag value is 29 bits. The length of the tag value has been increased by two such that every bit in the 27 MSBs appears in at least one of the pool value, set value, or tag value. In general, if up to L bits may be used for a pool value, then increasing the tag field 813 by L bits provides enough storage to disambiguate the cache entries even when all L bits of the pool value are also in the set value.

Figure 9:
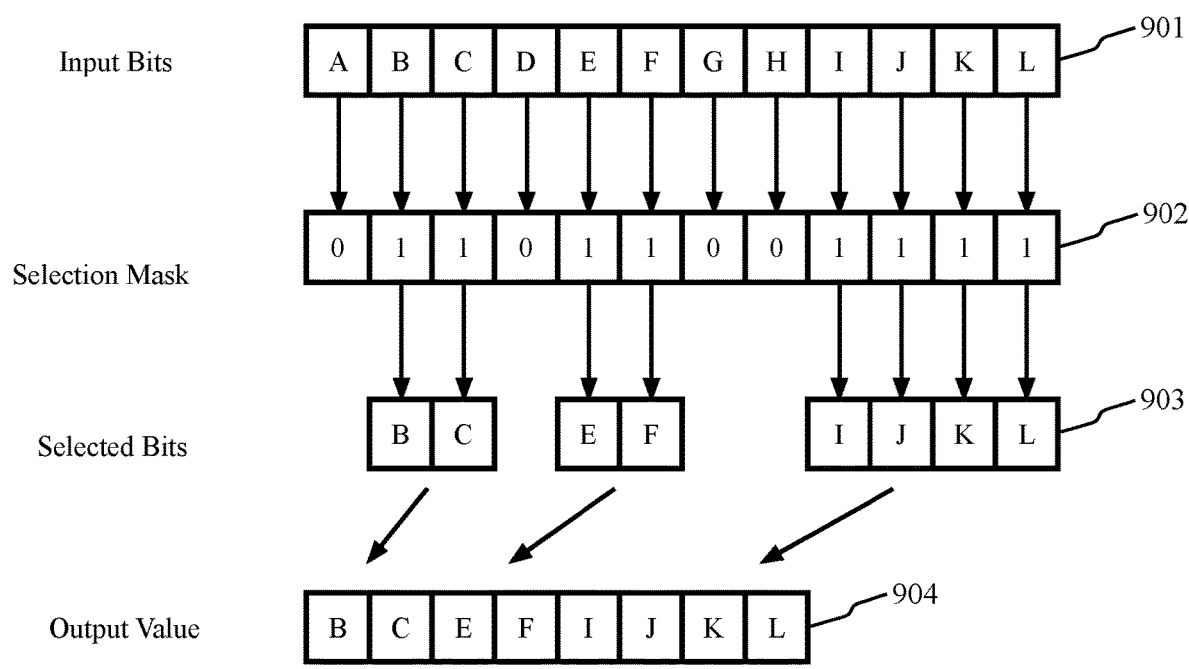
FIG. 9 is a high-level flow diagram illustrating use of a selection mask according to some aspects.

Certain of the examples use tag masks, set masks, and pool selection masks as selection masks to determine values such as pool values, set values, and tag values. FIG. 9 is a high-level flow diagram illustrating use of a selection mask 902 according to some aspects. The input 901 has 12 bits at positions A through L. The selection mask has bits set at positions B, C, E, F, I, J, K, and L. The bits at positions A, D, G and H of the selection mask are clear. Bits that are set in the selection mask indicate the selected bits 903 in the input that are to be included in the output value 904. The output value is 8 bits long and includes the bit values from the input 901 that were at positions B, C, E, F, I, J, K, and L. Those practiced in digital design or computer programming can implement selection masks using other techniques use n bits at specific locations in an input to create an n-bit value.

Figure 10:
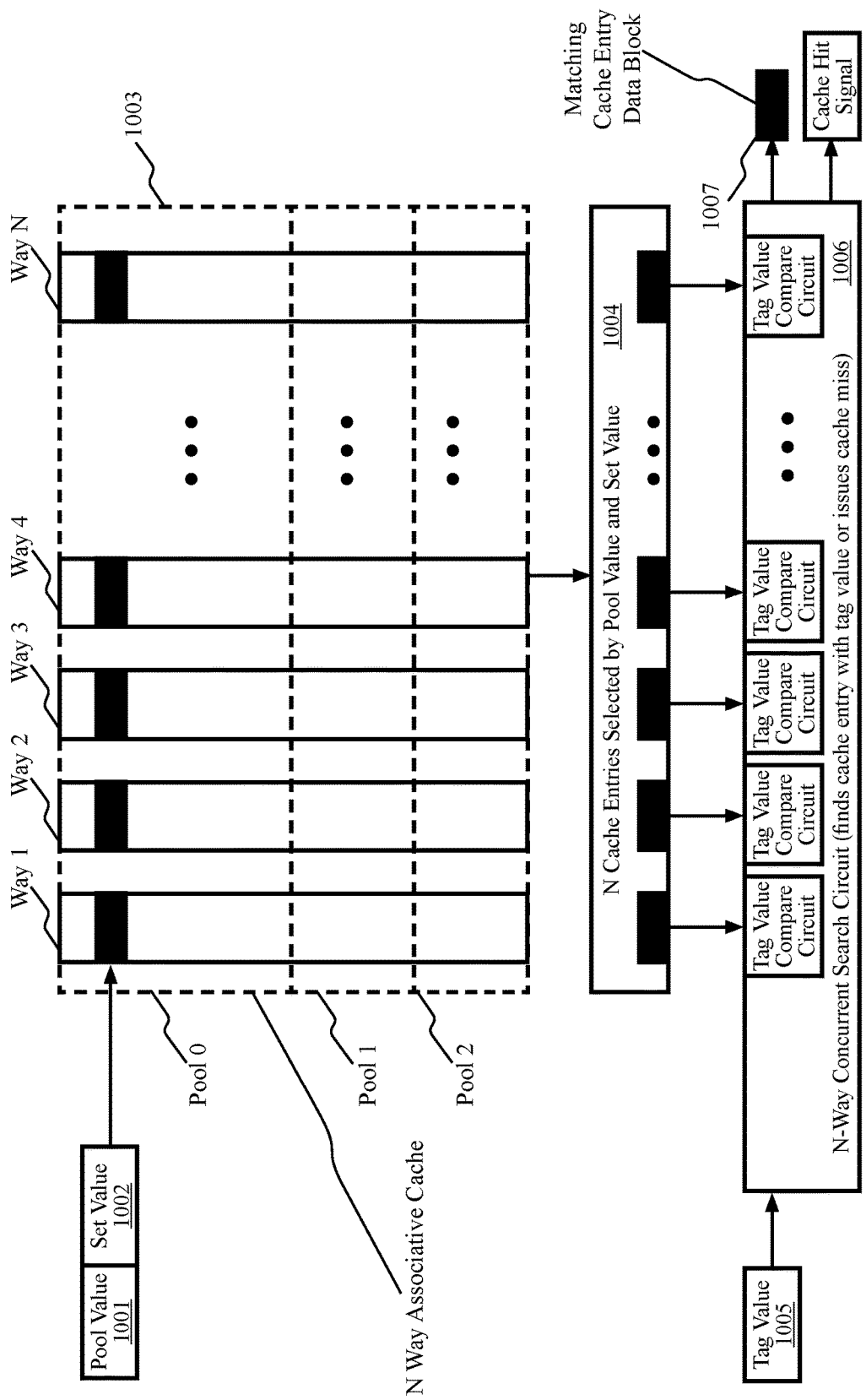
FIG. 10 is a high-level diagram illustrating reading data from an N-way associative cache according to some aspects.

FIG. 10 is a high-level diagram illustrating reading data from an N-way associative cache according to some aspects. In response to a read memory operation, the cache is checked to see if it is caching the physical address to be read. The physical memory address for the memory read operation is used to determine a pool value 1001, a set value 1002, and a tag value 1005. The pool value 1001 and a set value 1002 can select a set in an N-way associative cache 1003. The set includes N cache entries 1004. Any one, or none, of the N cache entries 1004 may be caching the physical memory address. The tag values stored in the N cache entries 1004 and the tag value 1005 may be input into an N-way concurrent search circuit 1006. The cache entries' flag bits indicate if a cache entry is valid. A valid cache entry has a valid tag value. An invalid cache entry has an invalid tag value. The N-way concurrent search circuit 1006 can search for the tag value 1005 by comparing the tag values in each of the N cache entries 1004 to the tag value 1005. If the tag value in one of the N cache entries 1004 is valid and is the same as the tag value 1005, then that cache entry is caching the physical address. The N-way associative cache 1003 or the N-way concurrent search circuit 1006 may than output the data block 1007 of cache entry that is caching the physical address. The N-way concurrent search circuit may produce a cache hit signal that indicates a cache hit if the tag value in one of the N cache entries 1004 is valid and is the same as the tag value 1005. If none of the tag values in the N cache entries 1004 is valid and the same as the tag value 1005, then a cache miss may be indicated because none of the cache entries are caching the physical memory address. The N-way concurrent search circuit 1006 can perform all of the compare operations concurrently. In fact, the concurrent search of all N cache entries can be performed in a single clock cycle.

Figure 11:
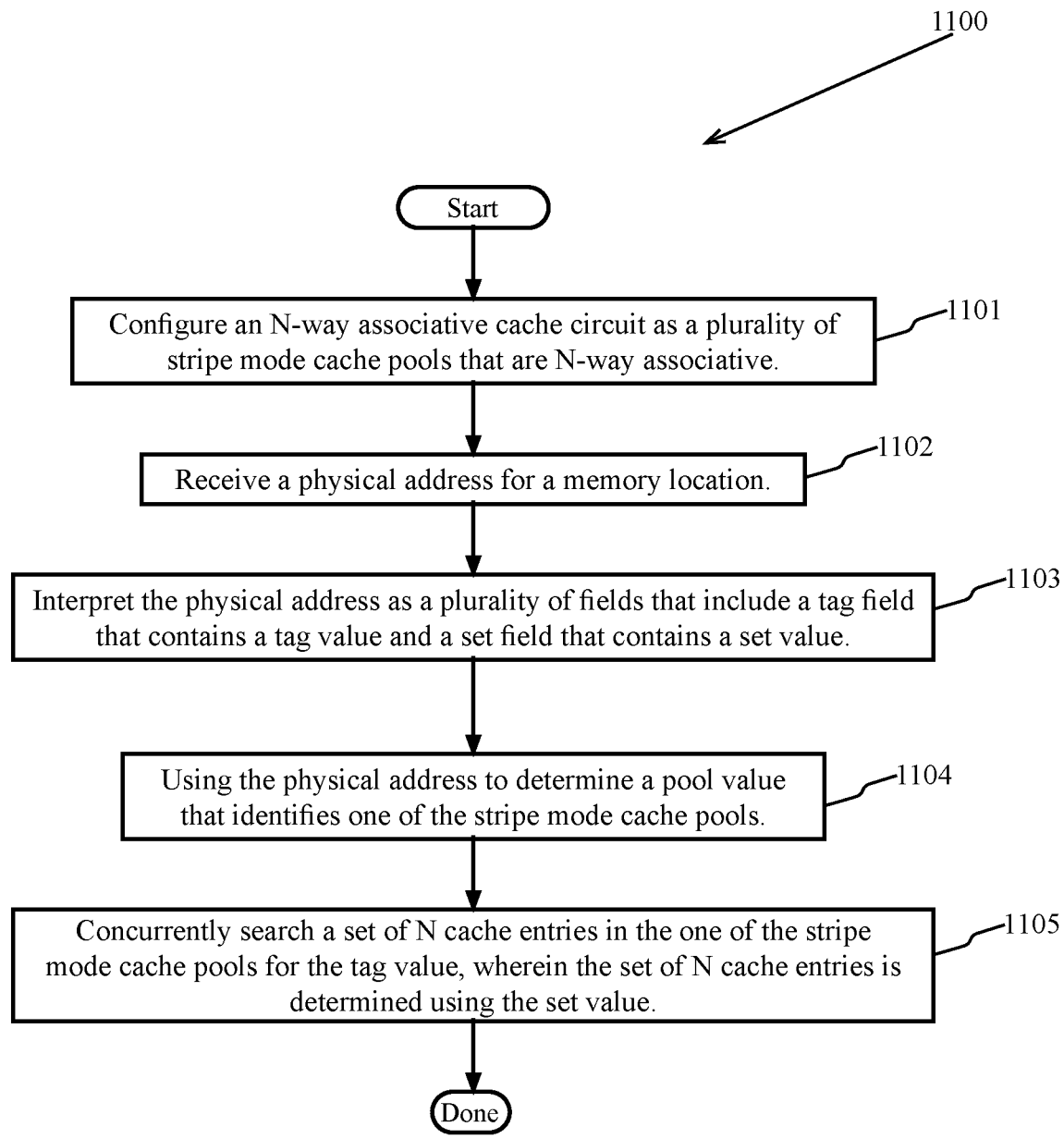
FIG. 11 a high-level flow diagram of a method for a stripe mode cache pool according to some aspects.

FIG. 11 a high-level flow diagram of a method for a stripe mode cache pool 1100 according to some aspects. The method can be implemented by a cache control circuit. After the start, at block 1101 an N-way associative cache circuit is configured as a plurality of stripe mode cache pools that are N-way associative. At block 1102 a physical address for a memory location is received. At block 1103, the physical address is interpreted as a plurality of fields that include a tag field that contains a tag value and a set field that contains a set value. At block 1104, the physical address is used to determine a pool value that identifies one of the stripe mode cache pools. At block 1105 the method can concurrently search a set of N cache entries in the one of the stripe mode cache pools for the tag value, wherein the set of N cache entries is determined using the set value.

Aspects described above can be ultimately implemented in a network appliance that includes physical circuits that implement digital data processing, storage, and communications. The network appliance can include processing circuits, ROM, RAM, CAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). The network appliance may be embodied as a single IC device (e.g., fabricated on a single substrate) or the network appliance may be embodied as a system that includes multiple IC devices connected by, for example, a printed circuit board (PCB). The interfaces may include network interfaces (e.g., Ethernet interfaces and/or InfiniBand interfaces) and/or PCI Express (PCIe) interfaces. The interfaces may also include other management and control interfaces such as I2C, general purpose IOs, USB, UART, SPI, and eMMC.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method implemented by a cache control circuit operatively coupled to an N-way associative cache circuit, the method including:
   configuring a plurality of sets of the N-way associative cache circuit as a plurality of stripe mode cache pools that are N-way associative;
   receiving a physical address for a memory location that includes
   a tag field that contains a tag value and a set field that contains a set value;

using the physical address to determine a pool value that identifies one of the stripe mode cache pools;
using the set value and the pool value to identify one of the sets of the N-way associative cache circuit that is in the one of the stripe mode cache pools; and
concurrently searching the one of the sets in the one of the stripe mode cache pools for the tag value,
wherein
the one of the stripe mode cache pools is N-way associative, and
the one of the stripe mode cache pools includes a plurality of the sets.

2. The method of claim 1, wherein a lookup table uses P consecutive bits of the physical address to determine the pool value.

3. The method of claim 1, wherein nonconsecutive bits of the physical address determine the pool value.

4. The method of claim 1, further including:
receiving a second physical address that includes a second tag value and a second set value;
using the second physical address to determine a second pool value that identifies a second one of the stripe mode cache pools;
using the second set value and the second pool value to identify a second one of the sets of the N-way associative cache circuit; and
concurrently searching the second one of the sets for the tag value,
wherein the pool value is a P1-bit pool value,
wherein the second pool value is a P2-bit pool value, and
wherein P1 does not equal P2.

5. The method of claim 1, further including reconfiguring the sets of the N-way associative cache circuit as a single stripe mode cache pool.

6. The method of claim 1, further including adding an additional stripe mode cache pool to the stripe mode cache pools, wherein the additional stripe mode cache pool includes at least one of the sets.

7. The method of claim 1, further including indicating a cache miss after concurrently searching the one of the sets in the one of the stripe mode cache pools for the tag value.

8. The method of claim 1, further including indicating a cache hit after concurrently searching the one of the sets in the one of the stripe mode cache pools for the tag value.

9. The method of claim 1, further including returning a cached data block after concurrently searching the one of the sets in the one of the stripe mode cache pools for the tag value.

10. The method of claim 1, wherein a dynamic random-access memory (DRAM) controller is configured to cache data in the N-way associative cache circuit.

11. A system comprising:
an N-way associative cache circuit that includes a plurality of sets that are N-way associative; and
a cache control circuit configured to:
configure the sets as a plurality of stripe mode cache pools that are N-way associative,
receive a physical address for a memory location that includes a tag field that contains a tag value and a set field that contains a set value,
use the physical address to determine a pool value that identifies one of the stripe mode cache pools,
use the set value and the pool value to identify one of the sets of the N-way associative cache circuit that is in the one of the stripe mode cache pools; and
concurrently search the one of the sets in the one of the stripe mode cache pools for the tag value,
wherein
the set includes N cache entries,
the one of the stripe mode cache pools is N-way associative, and
the one of the stripe mode cache pools includes a plurality of the sets.

12. The system of claim 11, wherein a lookup table uses P consecutive bits of the physical address to determine the pool value.

13. The system of claim 11, wherein nonconsecutive bits of the physical address determine the pool value.

14. The system of claim 11, wherein the cache control circuit is further configured to:
receive a second physical address that includes a second tag value and a second set value;
use the second physical address to determine a second pool value that identifies a second one of the stripe mode cache pools;
use the second set value and the second pool value to identify a second one of the sets of the N-way associative cache circuit; and
concurrently search the second one of the sets for the tag value,
wherein the pool value is a P1-bit pool value,
wherein the second pool value is a P2-bit pool value, and
wherein P1 does not equal P2.

15. The system of claim 11, wherein the cache control circuit is configured to:
add an additional stripe mode cache pool to the stripe mode cache pools; and
remove the additional stripe mode cache pool from the stripe mode cache pools.

16. The system of claim 11, wherein the cache control circuit is configured to indicate a cache miss after concurrently searching the one of the sets for the tag value.

17. The system of claim 11, wherein the cache control circuit is configured to indicate a cache hit after concurrently searching the one of the sets for the tag value.

18. The system of claim 11, wherein the cache control circuit is configured to return a cached data block after concurrently searching the one of the sets for the tag value.

19. The system of claim 11 further including a dynamic random-access memory (DRAM) controller wherein the DRAM controller is configured to cache data in the N-way associative cache circuit.

20. A system comprising:
a last level caching means that is N-way associative and that includes a plurality of sets that are N-way associative;
a means for configuring the sets as a plurality of stripe mode cache pools that are N-way associative;
an identification means that includes an addressing means and that identifies a DRAM memory location;
a means for determining a pool identification means from the identification means; and
a means for specifying a one of the sets based on the addressing means and the pool identification means,
wherein
the one of the stripe mode cache pools is N-way associative,
the one of the stripe mode cache pools includes a plurality of the sets, and
the one of the sets includes N cache entries.

* * * * *